Sept. 8, 1964　　　　J. P. GITS　　　　3,148,233
METHODS OF MAKING MOLDED ARTICLES
Filed March 7, 1960
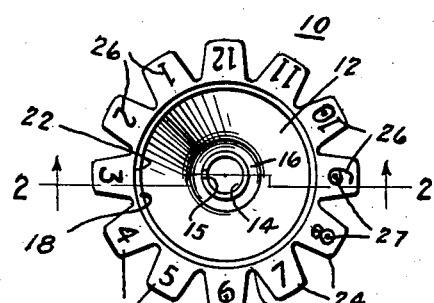
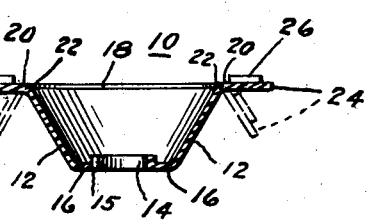
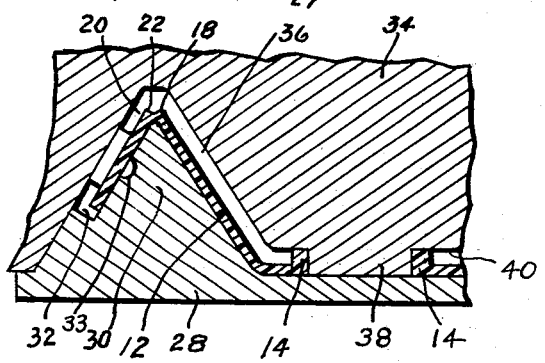
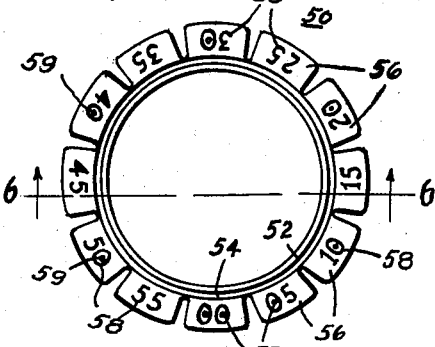
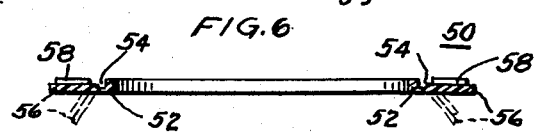
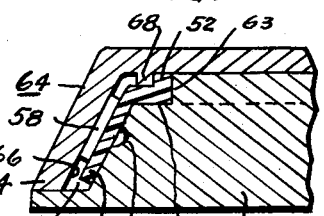
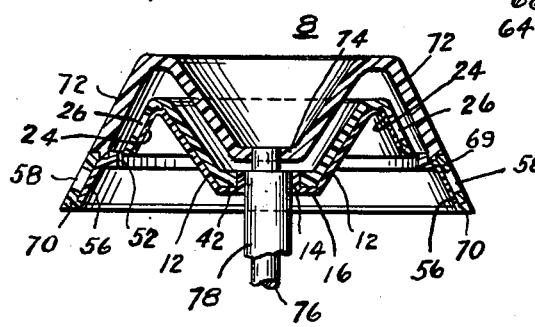
INVENTOR
JULES P. GITS
BY　Rey Eilers ATTY.

United States Patent Office 3,148,233
Patented Sept. 8, 1964

3,148,233
METHODS OF MAKING MOLDED ARTICLES
Jules Paul Gits, River Forest, Ill., assignor to J. P. Gits Molding Corporation, Chicago, Ill., a corporation of Illinois
Filed Mar. 7, 1960, Ser. No. 13,154
5 Claims. (Cl. 264—161)

This invention relates to improvements in methods of making molded articles. More particularly, this invention relates to improvements in methods of making molded, indicia-bearing articles.

It is therefore an object of the present invention to provide an improved method of making molded, indicia-bearing articles.

It is frequently desirable to provide molded, indicia-bearing articles that are capable of being trans-illuminated. Such articles can be set adjacent a source of illumination and can have the indicia thereof highlighted by light rays which emanate from that source and then pass through those articles. In some cases, those molded, indicia-bearing articels can be set adjacent sources of illumination which emanate an intensely bright light; and, in those cases, it is not very difficult to mold those articles, because those articles can be made relatively thick. In some cases, however, the molded, indicia-bearing articles must be set adjacent sources of illumination which emanate only moderately bright light; and, in such cases, it is difficult to mold those articles, because those articles must be made very thin. The present invention makes it possible to make very thin, molded, indicia-bearing articles, and thereby makes it possible to set those articles adjacent sources of illumination that emanate only moderately bright light. It is therefore an object of the present invention to provide a method of making very thin, molded, indicia-bearing articles.

The present invention produces very thin, molded, indicia-bearing articles by forming those articles as two "shots" and by subsequently cutting away parts of the rear faces of those two shots. The forming of those indicia-bearing articles as two shots is desirable because such formation makes it possible for the indicia to be permanent in nature and to have precise definition, but the forming of those articles as two shots is undesirable because such formation requires the first shot to be made thick. Specifically, the first shot must be made thick enough to withstand the temperatures and pressures needed to effect full bonding of the second shot to that first shot; and where the first shoe is thick, the combination of the first and second shots will necessarily be thick. However, the present invention overcomes the thickness of the combined first and second shots by cutting away portions of the rear faces of those shots to render the first shots readily light-transmissive. In this way, the present invention is enabled to make the first shot thick enough to withstand the temperatures and pressures needed to bond the second shot to that first shot, and yet is able to produce the thinness that is needed to make the finished article readily light-transmissive. It is therefore an object of the present invention to form the first shot of a molded, indicia-bearing article so it is just thick enough to withstand the temperatures and pressures to which it will be subject during the molding of the second shot and so parts of the rear face of that first shot can be cut-away to make that first shot readily light-transmissive.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing, FIG. 1 is a front elevational view of one form of first shot that is made in accordance with the principles and teachings of the present invention, FIG. 2 is a sectional view, on a larger scale, through the first shot of FIG. 1, and it is taken along the plane indicated by the line 2—2 in FIG. 1, FIG. 3 is a sectional view, on a still larger scale, through a mold in which the second shot will be applied to the first shot of FIGS. 1 and 2 to form a dial, and it shows that first shot within the cavity of that mold, FIG. 4 is a sectional view, on the scale of FIG. 3, through the first shot of FIGS. 1 and 2 after the second shot has been bonded to that first shot to form the dial, FIG. 5 is a front elevational view of another form of first shot that is made in accordance with the principles and teachings of the present invention, FIG. 6 is a sectional view, on a larger scale, through the first shot of FIG. 5, and it is taken along the plane indicated by the line 6—6 in FIG. 5, FIG. 7 is a sectional view, on a still larger scale, through a mold in which the second shot will be applied to the first shot of FIG. 6 to form a second dial, and it shows that first shot within the cavity of that mold, FIG. 8 is a sectional view through the dials which incorporate the first shots of FIGS. 1 and 5 as those dials are mounted on the rotatable shafts of a clock, and FIG. 9 is a sectional view, that is similar to FIG. 4, but that shows a fly cutter in cutting position.

Referring to the drawing in detail, the numeral 10 generally denotes a first shot that is made in accordance with the principles and teachings of the present invention. That first shot is preferably made from a plastic material that is white and that has a glossy surface. That first shot includes a frusto-conical portion 12 which defines a recess in the front of that first shot. A hub 14 is provided at the geometric center of the first shot 10, and a key-slot 15 is provided in that hub. A web 16 extends between and interconnects the hub 14 and the frusto-conical portion 12 of the first shot 10.

A narrow, flat, annular surface 18 is provided at the forward edge of the frusto-conical portion 12; and a narrow annular rim 20 is contiguous with that forward edge but is disposed radially outwardly of that annular surface. The rim 20 has an inner periphery 22 that is inclined relative to that rim and relative to the annular surface 18. The annular rim 20 supports a number of radially-extending pads 24; and those pads are spaced apart circumferentially, as shown by FIG. 1. Each of the pads 24 has an indicia 26 thereon; and, in the particular modification shown, those indicia represent the twelve hours of the day or night. Several of the indicia 26, as for example the "4," the "6," the "8," and "9," and the "10," are of the closed type which have "islands" therein; and passages 27 extend forwardly from the rear faces of the pads 24 to those islands.

The numeral 28 denotes one section of a mold in which the second shot will be applied to the first shot 10 to form the hour dial for a clock. That mold section has an upstanding annulus 30 which is triangular in cross section. An annular groove 32 is provided in the mold section 28, and that grooove is formed in the outer face of the annulus 30. The groove 32 has a frusto-conical inner face that is parallel to but is spaced radially inwardly of the frusto-conical outer face of the annulus 30. A second annular groove 33 is provided in the annulus 30, and that groove is semi-circular in cross section. The grooves 32 and 33 are contiguous, as shown by FIG. 3.

The other section of the mold of FIG. 3 is denoted by the numeral 34, and that section has an annular groove 36 that is generally V-shaped in cross section. The groove 36 is generally complementary to, but is wider and deeper than, the annulus 30 on the mold section 28. The annular groove 36 in the mold section 34 defines a central, cylindrical abutment 38; and that abutment is spaced from the groove 36 by an annular offset 40.

The numeral 42 denotes the second shot that is bonded to the first shot 10 to form the hour dial; and that second shot will overlie the front of the frusto-conical portion 12, will overlie the fronts and sides of the pads 24, and will abut the sides of the indicia 26. In addition, that second shot will fill the groove 33 and underlie the pads 24 and will then pass forwardly through the passages 27 to fill the islands in those indicia. The second shot 42 will preferably be made of a material having a high degree of light-opacity.

The numeral 50 generally denotes another first shot that is made in accordance with the principles and teachings of the present invention. That first shot is preferably made from a butyrate that is white in color. The first shot 50 has an annular rim 52, has an annular groove 54 that defines the outer periphery of the rim 52, and has a plurality of radially-extending pads 56. Those pads are spaced apart circumferentially, and each of those pads is provided with an indicia 58. In the particular modification shown, the indicia 58 denote every fifth minute of an hour. Several of the indicia 58, as for example the "05," the "10," the "20," the "30," the "40," the "50" and the "00," are of the closed type which have islands therein; and passages 59 extend forwardly from the rear faces of the pads 56 to those islands.

The numeral 60 denotes one section of a mold in which the second shot 70 is applied to the first shot 50 to form a minute dial for the clock, which utilizes the hour dial in which the first shot of FIGS. 1 and 2 is incorporated. That mold section has a peripheral groove 62 which has a frusto-conical inner face. A horizontal offset 61 extends inwardly from the upper edge of that frusto-conical inner face of the groove 62, and an annular wall 63 of cylindrical configuration extends upwardly from the inner edge of the horizontal offset 61. An annular groove 77 of semi-circular cross section is provided in the frusto-conical inner face of the groove 62.

The numeral 64 denotes the other section of the mold in which the second shot 70 is applied to the first shot 50. That other mold section has a frusto-conical inner surface 66, and it has a downwardly extending annular rim 68. That annular rim is spaced inwardly a short distance from the upper edge of the frusto-conical inner face 66 to define an offset. The second shot 70 will preferably be made from an implex which is an acrylic material that is tougher than butyrate; and it will preferably have a high degree of light-opacity. That second shot will overlie the fronts and sides of the pads 56 and will abut the sides of the indicia 58. In addition, that second shot will fill the groove 77 and will pass forwardly through the passages 59 to fill the islands in the indicia 58. Furthermore, the second shot 70 will coact with the rim 68 of the mold section 64 to define an annular groove 69.

In making the hour dial provided by the present invention, the first shot 10 will be formed in a suitable mold, not shown. That first shot will be molded so the pads 24 are initially flat and so the faces of the indicia 26 are flat. Such an arrangement facilitates the precise formation of the indicia 26.

It would be desirable to make the pads 24 thin enough to be readily light-transmissive; but it is absolutely essential that the pads 24 and the indicia 26 be made thick enough to withstand the temperatures and pressures to which they will be subjected during the injection of the second shot material 42 into the cavity defined by the mold sections 28 and 34. In one preferred embodiment of the present invention, the pads 24 have an initial thickness of from thirty to thirty five thousandths of an inch, and the indicia 26 have a thickness of thirty thousandths of an inch. The cavity formed by the mold sections 28 and 34 has a width that is substantially sixty thousandths of an inch; and those mold sections will, therefore, squeeze the pads 24 and the indicia 26 down to an overall thickness of substantially sixty thousandths of an inch.

The first shot 10 is made even thinner adjacent the forward edge of the frusto-conical portion 12, as at the junction of the flat, narrow surface 18 with the rim 20. Consequently, the displacing of the pads 24 to the positions indicated by FIG. 3 is facilitated. In being displaced to the positions shown by FIG. 3, the pads 24 are moved into the positions which they will occupy in the completed hour dial. The indicia 26 on those pads will form integral parts of the peripheral face of that dial when that dial is finished.

When the first shot 10 is disposed within the cavity formed by the mold sections 28 and 34, as indicated by FIG. 3, the rear face of the frusto-conical portion 12 will abut the inner face of the annulus 30 on the mold section 28, and the rear faces of the pads 24 will abut the frusto-conical face of the annular groove 32. At such time, the annular groove 33 will underlie the islands which are formed in the closed indicia 26. For example, the groove 33 will underlie the islands of the "4," the "6," the "8," the "9," and the "10." Also at such time, the hub 14 will engage and encircle the cylindrical abutment 38, and it will space the web 16 from the offset 40. The engagement between the annular offset 40 and the upper end of the hub 14 will hold the first shot 10 fixedly in position within the cavity defined by the mold sections 28 and 34.

A suitable sprue, not shown, will be provided for the mold section 34; and molten second shot material 42 will be introduced through that sprue into the cavity defined by the mold sections 28 and 34. That second shot material will fill the voids in that cavity; and, in doing so, will engage and bond to the front face of the frusto-conical portion 12, will engage and bond to the fronts and sides of the pads 24, and will engage and bond to the side faces of the indicia 26. Furthermore, the second shot material will enter the annular groove 33, at those points where that groove is not directly overlain by the pads 24, and will then move circumferentially through that groove to form a runner 43. Once the groove 33 has been filled, the second shot material will move outwardly into the passages 27 and will fill the islands in the closed indicia 26 on the pads 24.

At the conclusion of the molding of the second shot, the hour dial will be too thick to be set adjacent a light source that can emanate only a moderately bright light. Further, that dial could not be set adjacent any trans-illuminating light source without having the runner 43, formed within the groove 33, cast a heavy shadow on the indicia 26. To make the hour dial usable, it will be suitably held by a fixture or the like, and a fly cutter will be used to cut-away the runner 43 and to cut-away portions of the rear faces of the pads 24 and of the second shot 42. As a result, the total thickness of the rim of the hour dial will be less than the sixty thousandths of an inch thickness which that rim had at the conclusion of the step wherein the second shot was molded. The resulting reduced thickness of that rim makes it possible for light to pass readily through the pads 24 and indicia 26 of that dial.

The first shot 50 for the minute dial has pads 56 that have approximately the same thickness as the pads 24 of the first shot 10; and the indicia 58 on the pads 56 have thicknesses comparable to those of the indicia 26 on the pads 24. As a result, the overall thickness of each pad 56 and its indicia 58 is substantially sixty five thousandths of an inch. When the first shot 50 is placed within the cavity defined by the mold sections 60 and 64, the combined thickness of each pad 56 and its indicia 58 will be squeezed down to substantially sixty thousandths of an inch.

As indicated by FIG. 7, the pads 56 are displaced downwardly so the rear faces thereof will abut the frusto-conical inner face of the groove 62 of the mold section 60. The annular groove 54 in the first shot 50 facilitates this downward displacement of the pads 56. The front faces of the indicia 58 will abut the frusto-conical inner face 66 of the mold section 64 when the pads 56 are in the positions indicated by FIG. 7. The rim 68 in the mold section 64 will abut and encircle the rim 52 of the first shot 50, and it will engage the groove 54 of that first shot.

Second shot material 70 will be introduced into the cavity defined by the mold sections 60 and 64 through a sprue in the mold section 60; and that second shot material will engage and bond to the fronts and sides of the pads 56, and will engage and bond to the side faces of the indicia 58. That second shot material will also coact with the annular rim 68 to define an annular recess 69 in the second shot material of the minute dial. The second shot material 70 will also enter the annular groove 69, at those portions of that groove which are not overlain by the pads 56; and it will then move circumferentially through that groove until it underlies the pads 56. When the groove 69 has become filled with second shot material 70, some of that material will move forwardly through the passages 59 into the islands of the closed indicia 58 on the pads 56. As a result, the second shot material 70 will constitute a large part of the exterior of the minute dial and will fill the islands in the indicia of that dial. For example, the second shot material will fill the islands of the "05," the "10," the "20," the "30," the "40," the "50" and the "00."

After the second shot 70 of the minute dial has been molded to the first shot 50, that dial will be removed from the cavity defined by the mold sections 60 and 64 and will be suitably mounted in a fixture. Thereupon, the runner which formed in the annular groove 69 will be cut-away and parts of the rear faces of the pads 56 and of the second shot 70 will be cut-away, as by a fly cutter. That fly cutter will remove enough of the rear faces of the pads 56 to make the thickness of the rim of the minute dial less than the initial overall thickness of any one of the pads 56 and its indicia 58. As a result, light can readily pass through the indicia of the minute dial to illuminate that indicia.

The minute dial is then placed in another mold, not shown, wherein a transparent third shot 72 is formed. That third shot is preferably made from a clear acrylic material; and it has a hub 74. That hub is at the center of a recess which is defined by an annulus that is frusto-conical in cross section.

As indicated by FIG. 8, the hub 74 of the third shot 72 of the minute dial can be pressed onto the shaft 76 of a clock, and the hub 14 of the hour dial can be pressed onto the shaft 78 of that clock. The key-slot 15 in the hub 14 will suitably engage a key carried by the shaft 78. The shaft 76 will make one revolution per hour, and the shaft 78 will make one revolution every twelve hours. The clock will have a light source disposed adjacent the shaft 78 but, because of space limitations, that light source will be able to emanate light of only moderately bright intensity. Part of that light will pass directly to the rear faces of the pads 24 and 56, and that light will try to trans-illuminate the indicia 26 and 58, respectively. Other of that light will pass to the frusto-conical rear face of the portion 12 of the first shot and then be reflected outwardly to the rear faces of the pads 24 and 56 to assure trans-illumination of the indicia 26 and 58. As indicated by FIG. 8, the frusto-conical rear face of the portion 12 is at least partially co-extensive with the pads 56; and hence that rear face will help illuminate the indicia 58 as well as the indicia 26.

Whereas the drawing and accompanying description have shown and described a preferred embodiment of the present invention it should be apparent to those skilled in the art that various changes may be made in the form of the invention without affecting the scope thereof.

What I claim is:

1. The method of making molded articles, with indicia that can be transilluminated by a light source, which comprises molding a first shot with parts that are thin but that can successfully withstand the pressures and temperatures to which they will be subjected during the molding of a second shot into bonding engagement with said parts of said first shot, said parts of said first shot being molded with supporting pads and three-dimensional indicia that project forwardly from the front faces of said supporting pads, at least one of said indicia being of the closed type, said first shot being molded from a plastic material that is light-transmissive, said first shot being molded to have a part that holds and supports said supporting pads but that permits said pads to be displaced relative to it, displacing said supporting pads and said indicia thereon relative to said part of said first shot to generally define a rim for said article wherein the rear faces of said supporting pads define the inner periphery of said rim and wherein the front faces of said indicia define the outer periphery of said rim, molding second shot material into bonding engagement with said supporting pads and said indicia thereon and into the islands of said closed indicia, said second shot material being molded so it constitutes part of the inner and outer peripheries of said rim, said second shot being molded of a material which is darker in color than the material of said first shot, said second shot material being molded to form a runner at said inner periphery of said rim that underlies said islands of said closed indicia, and subsequently cutting-away said runner, whereby said indicia on said supporting pads can be readily trans-illuminated by light passing through said rim.

2. The method of making molded articles, with indicia that can be trans-illuminated by a light source, which comprises molding a first shot with three-dimensional indicia, at least one of said indicia being of the closed type, said first shot being molded from a plastic material that is light-transmissive, said first shot being molded to have a part that holds and supports said indicia but permits said indicia to be displaced relative to it, displacing said indicia relative to said part of said first shot to generally define a rim for said article, molding second shot material into bonding engagement with said indicia and into the islands of said closed indicia, said second shot material being molded to form a runner at the inner periphery of said rim that underlies said islands of said closed indicia, said second shot being molded of a material which is darker in color than the material of said first shot, and subsequently cutting-away said runner, whereby said indicia can be readily trans-illuminated by light passing through said rim.

3. The method of making molded articles, with indicia that can be trans-illuminated by a light source, which comprises molding a first shot with parts that are thin but that successfully withstand the pressures and temperatures to which they will be subjected during the molding of a second shot into bonding engagement with said parts of said first shot, said parts of said first shot being molded with three-dimensional indicia, at least one of said indicia being of the closed type, said first shot being molded from a plastic material that is light-transmissive, molding second shot material into bonding engagement with said indicia and so portions of said second shot material flow into the islands of said closed indicia and so further portions of said second shot material underlie parts of said indicia, said second shot material being darker in color than the material of said first shot, and subsequently cutting-away said further portions of said second shot material whereby said indicia can be readily trans-illuminated.

4. The method of making molded articles, with indicia that can be trans-illuminated by a light source, which comprises molding a first shot with three-dimensional indicia, at least one of said indicia being of the closed type, said first shot being molded from a plastic material that is light-transmissive, said first shot being molded to have a frusto-conical part that holds and supports said indicia adjacent the front thereof and that defines a rearwardly-extending conical surface, said first shot being molded so said indicia can be displaced relative to it, displacing said indicia relative to said frusto-conical part of said first shot to generally define a rearwardly-extending rim for said article that is partially coextensive with said rearwardly-extending conical surface of said frusto-conical part of said first shot and wherein the front faces of said indicia define the outer periphery of said rim, molding second shot material into bonding engagement with said indicia so portions of said second shot material flow into the islands of said closed indicia and so further portions of said second shot material underlie parts of said indicia, said second shot material being darker in color than the material of said first shot, and subsequently cutting-away said further portions of said second shot material, whereby said indicia can be readily trans-illuminated by light passing through said rim, said displacing of said indicia enabling part of said light to pass directly from a source of illumination to the rear face of said rim and other of said light to pass from said source of illumination to said rearwardly-extending conical surface of said frusto-conical part of said first shot and to be reflected toward said rear face of said rim.

5. The method of making molded articles, with indicia that can be trans-illuminated by a light source, which comprises molding a first shot with parts that are thin but that can withstand the pressures and temperatures to which they will be subjected during the molding of a second shot into bonding engagement with said parts of said first shot, said parts of said first shot including indicia, at least one of said indicia being of the closed type, said first shot being made of a plastic material that is light-transmissive, said first shot having a part that holds and supports said indicia and that can yield to permit said indicia to be displaced relative to said first shot, displacing said indicia relative to said first shot until the front faces of said indicia generally define the periphery of said article, molding second shot material into bonding engagement with said indicia and into the islands of said closed indicia, said second shot material being darker in color than the material of said first shot, said second shot material forming a runner at the rear of said periphery of said article that underlies said islands of said closed indicia, and subsequently cutting-away said runner, whereby said indicia can be readily trans-illuminated by light passing through said periphery of said article.

References Cited in the file of this patent

UNITED STATES PATENTS

| | | |
|---|---|---|
| 1,589,464 | Frederick | June 22, 1926 |
| 2,108,144 | Reilly | Feb. 15, 1938 |
| 2,510,091 | Dofsen et al. | June 6, 1950 |
| 2,517,095 | Dixon | Aug. 1, 1950 |
| 2,586,978 | Murray | Feb. 26, 1952 |
| 2,607,957 | Danielson | Aug. 26, 1952 |
| 2,765,555 | Gits et al. | Oct. 9, 1956 |
| 2,897,546 | Clapp et al. | Aug. 4, 1959 |

FOREIGN PATENTS

| | | |
|---|---|---|
| 521,056 | Great Britain | May 10, 1940 |